US009464920B2

(12) United States Patent
Kim (10) Patent No.: US 9,464,920 B2
(45) Date of Patent: Oct. 11, 2016

(54) SENSING APPARATUS FOR MEASURING POSITION OF TOUCH OBJECT BY ELECTROMAGNETIC INDUCTION AND METHOD FOR CONTROLLING THE SAME

(75) Inventor: Byung-Jik Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 696 days.

(21) Appl. No.: 13/613,947

(22) Filed: Sep. 13, 2012

(65) Prior Publication Data

US 2013/0069636 A1  Mar. 21, 2013

(30) Foreign Application Priority Data

Sep. 15, 2011 (KR) ........................ 10-2011-0092968

(51) Int. Cl.
*G01B 7/14* (2006.01)
*G01D 5/20* (2006.01)

(52) U.S. Cl.
CPC .................................. *G01D 5/2053* (2013.01)

(58) Field of Classification Search
CPC .............................. G01D 5/2053; G01B 7/14
USPC ........................................ 324/207.15, 207.17
See application file for complete search history.

(56) References Cited

U.S. PATENT DOCUMENTS

| 5,914,710 A | 6/1999 | Chen et al. |
| 6,246,393 B1 | 6/2001 | Watanabe et al. |
| 2011/0216032 A1* | 9/2011 | Oda et al. ............ 345/174 |
| 2014/0071070 A1 | 3/2014 | Xiang et al. |

FOREIGN PATENT DOCUMENTS

| CN | 201259668 | 6/2009 |
| CN | 102129324 | 7/2011 |
| EP | 0 689 156 | 12/1995 |
| JP | 08-044480 | 2/1996 |
| JP | 8213818 | 8/1996 |
| JP | 10-222283 | 8/1998 |
| JP | 2002-297302 | 10/2002 |
| JP | 2010-225001 | 10/2010 |
| KR | 100913741 | 8/2009 |

OTHER PUBLICATIONS

Japanese Office Action dated May 30, 2016 issued in counterpart application No. 2012-204245, 6 pages.
Chinese Office Action dated Jun. 1, 2016 issued in counterpart application No. 201210345303.8, 16 pages.

* cited by examiner

*Primary Examiner* — Bot Ledynh
(74) *Attorney, Agent, or Firm* — The Farrell Law Firm, P.C.

(57) ABSTRACT

An electromagnetic sensing apparatus for measuring the position of a touch object by electromagnetic induction and a method for controlling the same are provided. The apparatus includes a loop unit including first and second sub-loop units for alternately receiving current and sensing an electromagnetic change; and a controller for controlling the first sub-loop unit to alternate between receiving the current and sensing the electromagnetic change in every one of a predetermined time period and controlling the second sub-loop unit to alternate between receiving the current and sensing the electromagnetic change in every predetermined time period, alternately with the first sub-loop unit.

12 Claims, 10 Drawing Sheets

SENSING APPARATUS FOR MEASURING POSITION OF TOUCH OBJECT BY ELECTROMAGNETIC INDUCTION AND METHOD FOR CONTROLLING THE SAME

PRIORITY

This application claims priority under 35 U.S.C. §119(a) to a Korean Patent Application filed in the Korean Intellectual Property Office on Sep. 15, 2011 and assigned Serial No. 10-2011-0092968, the entire contents of which are incorporated herein by reference.

BACKGROUND OF THE INVENTION

1. Field of the Invention

The present invention relates generally to electromagnetic induction input technology, and more particularly to a sensing apparatus based on electromagnetic induction input technology and a method for controlling the same.

2. Description of the Related Art

Along with the rapid growth of markets for smart phones and other touch screen devices, extensive research has recently been conducted on these technologies. A user can input a specific command to a smart phone or other touch screen device by selecting a specific position or icon on the display of the touch screen device with a user's body part or an Electromagnetic Induction (EI) pen.

The selection through contact with a user's body part can be implemented by capacitive touch screen technology. A capacitive touch screen typically includes transparent electrodes and condensers between the transparent electrodes. As the user touches the touch screen, the touch is sensed based on the resulting changed capacity of the condensers.

However, it is difficult to provide precise input with capacitive type touch screens due to a relatively large contact area over which a user touches the touch screen a body part. In contrast, EI touch screen technology offers the benefit of operation in response to a touch over a small area with an EI pen.

The EI scheme controls generation of an electromagnetic field by applying a voltage to a loop coil disposed on a Printed Circuit Board (PCB) and controls transfer of the electromagnetic field to an EI pen. The EI pen includes a condenser and a loop and emits the received electromagnetic field in a specific frequency.

The electromagnetic field emitted from the EI pen is transferred to the loop coil of the PCB so that a position on the touch screen corresponding to the EI pen can be determined based on the electromagnetic field.

Conventionally, in order to apply an electromagnetic field to an EI pen, current flows through all loop coils arranged on a PCB for EI. As a result, power consumption in the touch screen device is increased. Especially when a portable battery is used, such as in a mobile device, increased power consumption reduces battery life, which may have significant adverse effects on user convenience.

Moreover, conventional EI technology requires a long time in order to sense input, due to each of the loop coils on the PCB being controlled to sense a change in the electromagnetic field received from the EI pen.

SUMMARY OF THE INVENTION

An aspect of embodiments of the present invention is to address at least the problems and/or disadvantages and to provide at least the advantages described below. Accordingly, an aspect of embodiments of the present invention is to provide an electromagnetic sensing apparatus in which first and second sub-loop units included in a loop unit alternate between current flowing and electromagnetic change sensing during predetermined time periods.

In accordance with an embodiment of the present invention, an electromagnetic sensing apparatus for measuring, by electromagnetic induction, the position of an object with respect to a device including the electromagnetic sensing apparatus, is provided. The apparatus includes a loop unit including first and second sub-loop units for alternately receiving current and sensing an electromagnetic change; and a controller for controlling the first sub-loop unit to alternate between receiving the current and sensing the electromagnetic change in every one of a predetermined time period and controlling the second sub-loop unit to alternate between receiving the current and sensing the electromagnetic change in every predetermined time period, alternately with the first sub-loop unit.

In accordance with another embodiment of the present invention, a method for controlling an electromagnetic sensing apparatus including first and second sub-loop units for measuring, by electromagnetic induction, the position of an object with respect to a device including the electromagnetic sensing apparatus is provided. The method includes controlling the first sub-loop unit to alternate between receiving current and sensing an electromagnetic change in every one of a predetermined time period; and controlling the second sub-loop unit to alternate between receiving the current and sensing the electromagnetic change in every one of the predetermined time period, alternately with the first sub-loop unit.

In accordance with another embodiment of the present invention, an electromagnetic sensing apparatus based on electromagnetic induction is provided. The apparatus includes a loop unit including first and second sub-loop units, each sub-loop unit including a plurality of loops, for alternately receiving current and sensing an electromagnetic change; and a controller for controlling one loop of the first sub-loop unit to receive the current and the second sub-loop unit to sense the electromagnetic change during an iteration of a first time period and controlling one loop of the second sub-loop unit to receive the current and the first sub-loop unit to sense the electromagnetic change during an iteration of a second time period.

In accordance with another embodiment of the present invention, a method for controlling an electromagnetic sensing apparatus including first and second sub-loop units, each sub-loop unit including a plurality of loops, for measuring, by magnetic induction, the position of an object with respect to a device including the electromagnetic sensing apparatus is provided. The method includes determining sensing ranges by dividing the loops of each of the first and second sub-loop units into a predetermined number of groups; measuring sensing signals from the first and second sub-loop units according to the determined sensing ranges; determining the position of the touch object based on sensing signals from maximum signal loops each having a sensing signal with a measured maximum magnitude in the first and second sub-loop units and sensing signals from loops adjacent to the maximum signal loops; comparing the magnitudes of the sensing signals from the loops adjacent to the maximum signal loops; and resetting the sensing ranges based on a comparison result.

In accordance with a further embodiment of the present invention, t an electromagnetic sensing apparatus for measuring, by electromagnetic induction, the position of an object with respect to a device including the electromagnetic sensing apparatus is provided. The apparatus includes a loop unit including a plurality of loops for alternately receiving current and sensing an electromagnetic change; and a controller for controlling at least two loops from among the plurality of loops to sense an electromagnetic change simultaneously.

BRIEF DESCRIPTION OF THE DRAWINGS

The above and other objects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Embodiments of the present invention are described as follows with reference to the attached drawings. In the drawings, like reference numerals denote the same or similar components. Detailed descriptions of generally known functions and structures are omitted in order to avoid obscuring the subject matter of the present invention.

Figure 1:
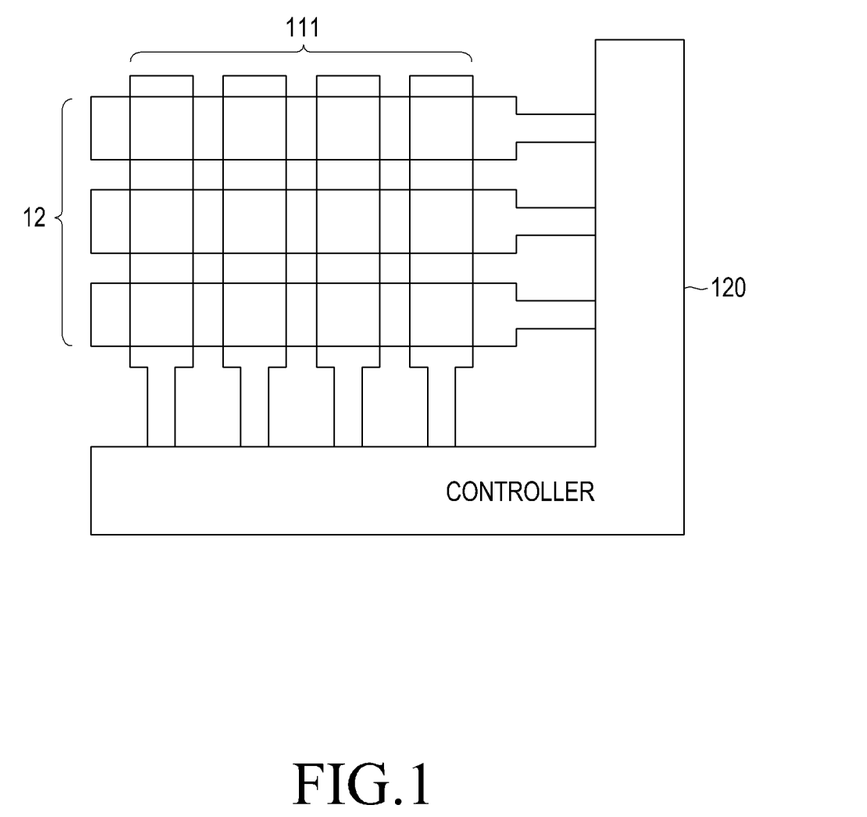
FIG. 1 is a conceptual diagram illustrating an electromagnetic sensing apparatus according to an embodiment of the present invention.

FIG. 1 is a conceptual diagram illustrating an electromagnetic sensing apparatus according to an embodiment of the present invention.

Referring to FIG. 1, the electromagnetic sensing apparatus includes first and second sub-loop units 111 and 112 and a controller 120. The first and second sub-loop units 111 and 112 collectively form a loop unit.

The first and second sub-loop units 111 and 112 are arranged so that they intersect perpendicularly. While a plurality of loops are shown in FIG. 1 as spaced from one another in each of the first and second sub-loop units 111 and 112, this configuration is merely provided as an example for clarity of description. The plurality of loops within each of the sub-loop units 111 and 112 may overlap each other in order to more accurately detect the coordinates of a pen in accordance with embodiments of the present invention.

The plurality of loops in the first sub-loop unit 111 extends along a Y axis in order to sense X-axis coordinates. Meanwhile, the plurality of loops in the second sub-loop unit 112 extends along the X axis in order to sense Y-axis coordinates. Each of the plurality of loops in the first and second sub-loop units 111 and 112 senses an electromagnetic change and receives current.

As described above, the configuration of the first and second sub-loop units 111 and 112 as sets of perpendicularly intersecting loops is merely provided as an example. Accordingly, the loops of the electromagnetic sensing apparatus may be divided into the first and second sub-loop units 111 and 112 in other various manners in accordance with embodiments of the present invention.

The first sub-loop unit 111 receives current from the controller 120, and the current flows through the loops of the first sub-loop unit 111 during a predetermined first time period. The first sub-loop unit 111 induces a predetermined electromagnetic field using the current and emits the electromagnetic field to the exterior of the device containing the electromagnetic sensing apparatus. The predetermined time period may be changed according to various conditions. Although, in the present example, the controller 120 applies current directly to each sub-loop unit, according to other embodiments of the present invention, the controller 120 may instead control a power supply to the sub-loop units through an additional power supply.

An EI pen close to the loop unit receives the induced electromagnetic field from the first sub-loop unit 111 and emits the induced electromagnetic field. Although the present example refers to an EI pen, other devices that receive and emit electromagnetic fields may be used in accordance with embodiments of the present invention. Herein, such devices are also referred to as touch objects.

Meanwhile, the loops of the second sub-loop unit 112 are controlled to sense electromagnetic changes during the first time period. The loops of the second sub-loop unit 112 also sense changes in the electromagnetic field emitted from the EI pen. Because the EI pen can emit the electromagnetic field received from the first sub-loop unit 111, the electromagnetic field has been changed, and this electromagnetic change is sensed by the second sub-loop unit 112. The second sub-loop unit 112 senses electromagnetic changes and determines the Y-axis coordinate of the EI pen based on the magnitude of a maximum sensing signal sensed by a signal loop (referred to as a maximum signal loop) and the magnitudes of sensing signals from loops adjacent to the maximum signal loop.

The second sub-loop unit 112 outputs all of sensing signals sensed by loops other than the maximum signal loop to the controller 120 and the controller 120 determines a peak based on the sensing signals from the plurality of loops. Therefore, the Y-axis coordinate of the EI pen can be determined more accurately.

As described above, the controller 120 controls the first sub-loop unit 111 to receive current and controls the second sub-loop unit 112 to sense electromagnetic changes during the first time period.

After the first time period, a second time period commences, during which the controller 120 controls the first sub-loop unit 111 to sense electromagnetic changes and controls the second sub-loop unit 112 to receive current. Herein, with respect to the terms "first time period" and "second time period" the terms first and second are used to distinguish between two alternating time periods, and there may be more than one occurrence of each of the first and second time periods during operations performed in accordance with embodiments of the present invention.

Therefore, each loop of the second sub-loop unit 112 receives current and induces and emits an electromagnetic field using the current.

The EI pen receives the electromagnetic field from each loop of the second sub-loop unit 112 and emits the received electromagnetic field.

Each loop of the first sub-loop unit 111 senses a change in the electromagnetic field emitted from the EI pen. Thus, the X-axis coordinate of the EI pen is determined based on the magnitude of a maximum sensing signal sensed by a maximum signal loop and the magnitudes of sensing signals sensed by loops adjacent to the maximum signal loop.

The first sub-loop unit 111 outputs all of sensing signals sensed by loops other than the maximum signal loop to the controller 120 and the controller 120 determines a peak based on the sensing signals and thus determines the X-axis coordinate of the EI pen.

As described above, the controller 120 controls the second sub-loop unit 112 to receive current and controls the first sub-loop unit 111 to sense electromagnetic changes, during the second time period. Subsequently, the controller 120 repeats the operation set for the first time period.

More specifically, the controller 120 controls the first sub-loop unit 111 to alternate between current reception (i.e., emitting electromagnetic fields) and electromagnetic change sensing at a predetermined interval. The controller 120 controls the second sub-loop unit 112 to alternate between current reception and electromagnetic change sensing at the predetermined interval, alternately with the first sub-loop unit 111.

Meanwhile, during the second time period the controller 120 provides current flow only through a maximum sensing loop that has sensed a maximum sensing signal during the first time period in the second sub-loop unit, rather than through all loops of the second sub-loop unit 112.

Switching between the first and second time periods is relatively fast, compared to displacement of the EI pen. Therefore, the EI pen may still be located in the vicinity of the maximum signal loop of the second sub-loop unit 112 even after the first time period.

Accordingly, even though current flows only through the maximum signal loop of the second sub-loop unit 112 during the second time period, the EI pen receives and emits an electromagnetic field having a sufficient magnitude. As current flows only through one specific loop rather than through all loops, in contrast to conventional operations, power consumption is significantly reduced.

As described above, after the second time period, the controller 120 repeats the operation set for the first time period. Notably, although current flows through all loops of the first sub-loop unit during the initial first time period, current may flow only through a maximum signal loop that has sensed a maximum sensing signal in the first sub-loop unit 111 during the second time period, during another first time period. As described above, the second time period switches to the first time period relatively fast, compared to the displacement of the EI pen. Since after the second time period, the EI pen may still be located in the vicinity of the maximum signal loop of the first sub-loop unit 111, the EI pen may receive an electromagnetic field having a sufficient magnitude in spite of current flowing only through the maximum signal loop of the first sub-loop unit 111 during the first time period.

When the controller 120 subsequently provides current through the first or second sub-loop unit 111 or 112, the controller 120 may control current to flow only through the maximum signal loop of the previous time period in the first or second sub-loop unit 111 or 112. The controller 120 also controls the first and second sub-loop units 111 and 112 to alternately sense electromagnetic changes and thus determines the time-series coordinates of the EI pen.

When the controller 120 controls the first or second sub-loop unit 111 or 112 to sense electromagnetic changes, the controller 120 may control the loops of the first or second sub-loop unit 111 or 112 to sense electromagnetic changes in groups. For example, if the first sub-loop unit 111 includes 258 loops and is controlled to sense electromagnetic changes, the controller 120 may group the loops of the first sub-loop unit 111 into six groups and may control each group to sense an electromagnetic change. Conventionally, an electromagnetic change is sensed on a per-loop basis. If time t is taken for one loop to sense an electromagnetic change, conventional operations may require 258t in order to sense electromagnetic changes in all loops. According to the present invention, because the controller 120 controls electromagnetic change sensing on a per-group basis, for example, through each of six groups. Consequently, electromagnetic changes can be sensed in a shorter time (i.e., 43t in the present example), and thus electromagnetic change sensing may be performed a plurality of times over a shorter period of time, thereby increasing the Signal to Noise Ratio (SNR) of a sensing signal.

Figure 2A:
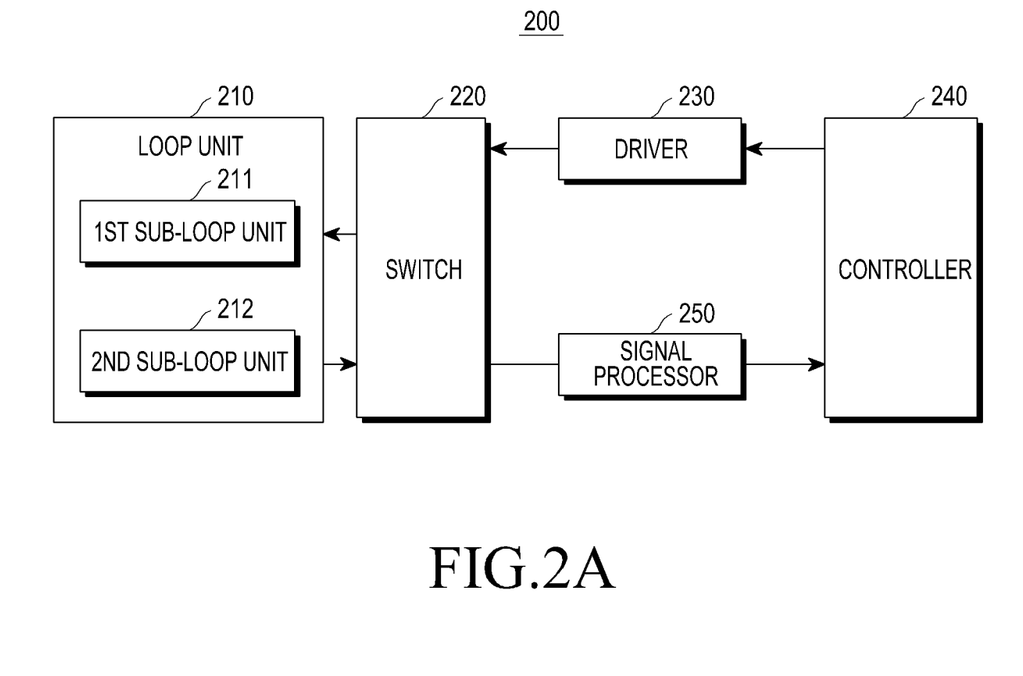
FIG. 2A is a block diagram illustrating an electromagnetic sensing apparatus according to an embodiment of the present invention.

FIG. 2A is a block diagram illustrating an electromagnetic sensing apparatus according to an embodiment of the present invention.

Referring to FIG. 2, the electromagnetic sensing apparatus includes a loop unit 210, a switch 220, a diver 230, a controller 240, and a signal processor 250.

The loop unit 210 includes first and second sub-loop units 211 and 212. Each of the first and second sub-loop units 211 and 212 includes a plurality of loops. The loops of the first sub-loop unit 211 intersect perpendicularly with the loops of the second sub-loop unit 212, although other arrangements may be used in accordance with other embodiments of the present invention.

The switch 220 alternately outputs current received from the driver 230 to the first and second sub-loop units 211 and 212 during predetermined time periods under the control of the controller 240.

During the first time period, the switch 220 switches to the first sub-loop unit 211, thus providing current through the first sub-loop unit 211. During the second time period, the switch 220 switches to the second sub-loop unit 212, thus providing current through the second sub-loop unit 212.

The driver 230 generates current and outputs the current to the switch 220. Any of various devices that can store a predetermined power and generate current of a predetermined intensity may be used as the driver 230 according to embodiments of the present invention.

Meanwhile, the switch 220 alternately switches to the first and second sub-loop units 211 and 212 during predetermined time periods under the control of the controller 240. Therefore, the first sub-loop unit 211 is connected to the signal processor 250 during the second time period and the second sub-loop unit 212 is connected to the signal processor 250 during the first time period. The signal processor 250 receives a sensing signal from the first sub-loop unit 211 during the second time period and from the second sub-loop unit 212 during the first time period. As described above, the switch 220 switches the loops of a sub-loop unit that senses electromagnetic changes to the signal processor 250 on a per-group basis.

The signal processor 250 processes a received sensing signal to a form that can be processed in the controller 240.

The controller 240 determines the coordinates of the EI pen based on sensing signals received from the loops of the sub-loop units 211 and 212 through the signal processor 250. The controller 240 may be implemented as a microprocessor, an Integrated Circuit (IC), a Central Processing Unit (CPU), a mini computer, etc.

Figure 2B:
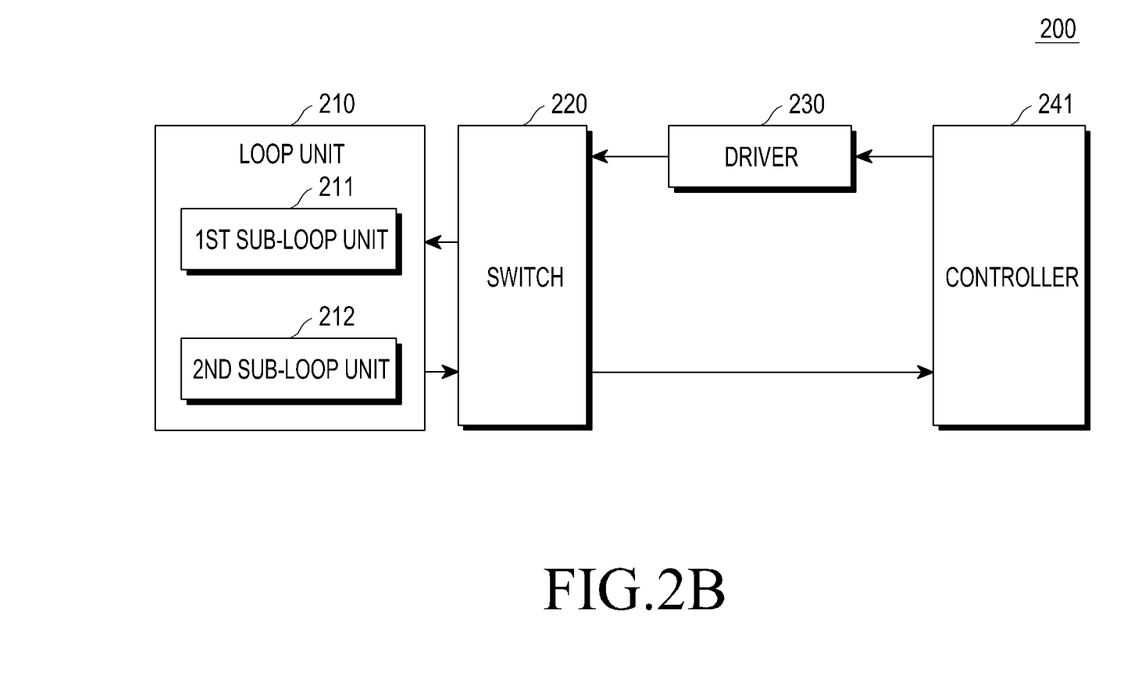
FIG. 2B is a block diagram illustrating an electromagnetic sensing apparatus according to another embodiment of the present invention.

FIG. 2B is a block diagram illustrating an electromagnetic sensing apparatus according to another embodiment of the present invention.

Referring to FIG. 2B, the electromagnetic sensing apparatus does not include the signal processor 250, in contrast to the electromagnetic sensing apparatus illustrated in FIG. 2A. While an analog signal is processed independently of the controller 240 in the electromagnetic sensing apparatus illustrated in FIG. 2A, an analog signal is processed in a controller 241 in the electromagnetic sensing apparatus illustrated in FIG. 2B.

Figure 2C:
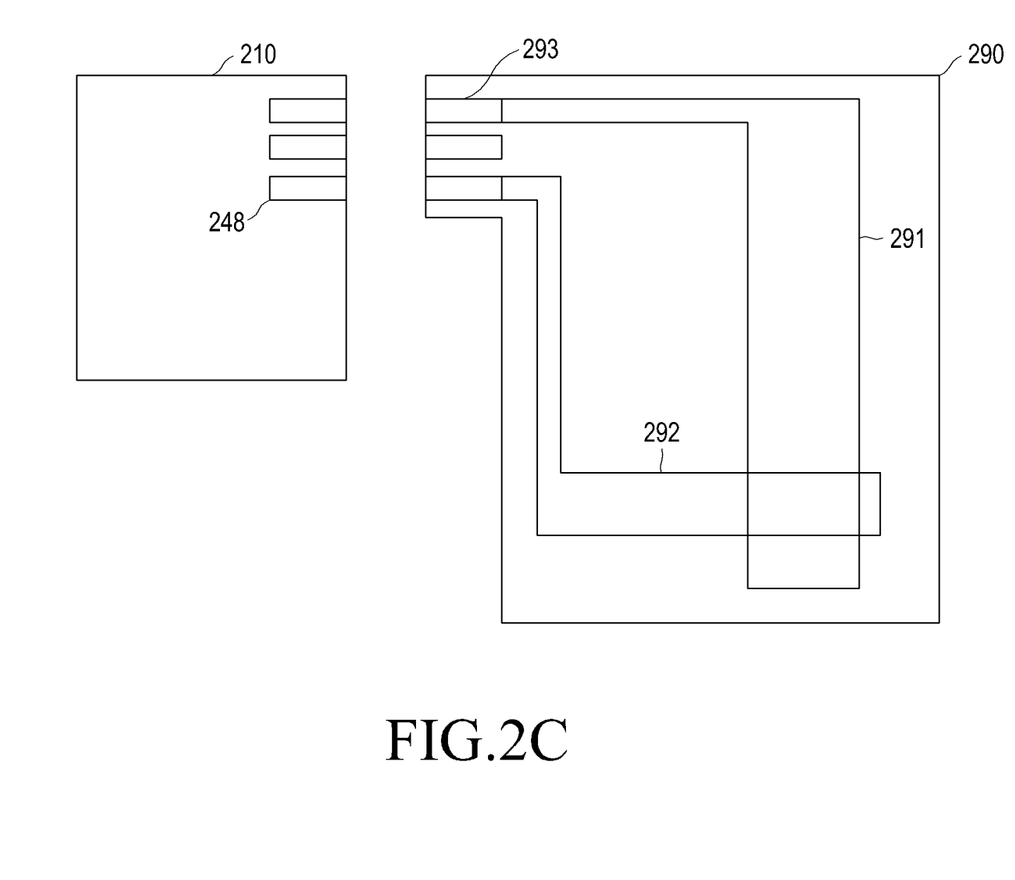
FIG. 2C is a conceptual diagram illustrating an implementation of an electromagnetic sensing apparatus according to an embodiment of the present invention.

FIG. 2C is a conceptual diagram illustrating an implementation of an electromagnetic sensing apparatus according to an embodiment of the present invention.

Referring to FIG. 2C, the controller 240 may be implemented on an IC arranged on a Printed Circuit Board (PCB), for example. Meanwhile, the controller 240 may be incorporated into a control chip of a portable phone including a CPU or the electronic sensing apparatus on a PCB. The controller 240 includes a connector unit 248. The connector unit 248 may include a signal transmitter for inputting/outputting input/output signals of a plurality of channels. The connector unit 248 may be configured into, for example, gold fingers. However, other configurations of the connector unit 248 may be used in accordance with embodiments of the present invention. In addition, the number of the gold fingers illustrated in FIG. 2C is merely provided as an example.

A loop unit 290 includes first and second sub-loop units 291 and 292, which may be connected to independent channels, that is, independent connectors.

Figure 3A:
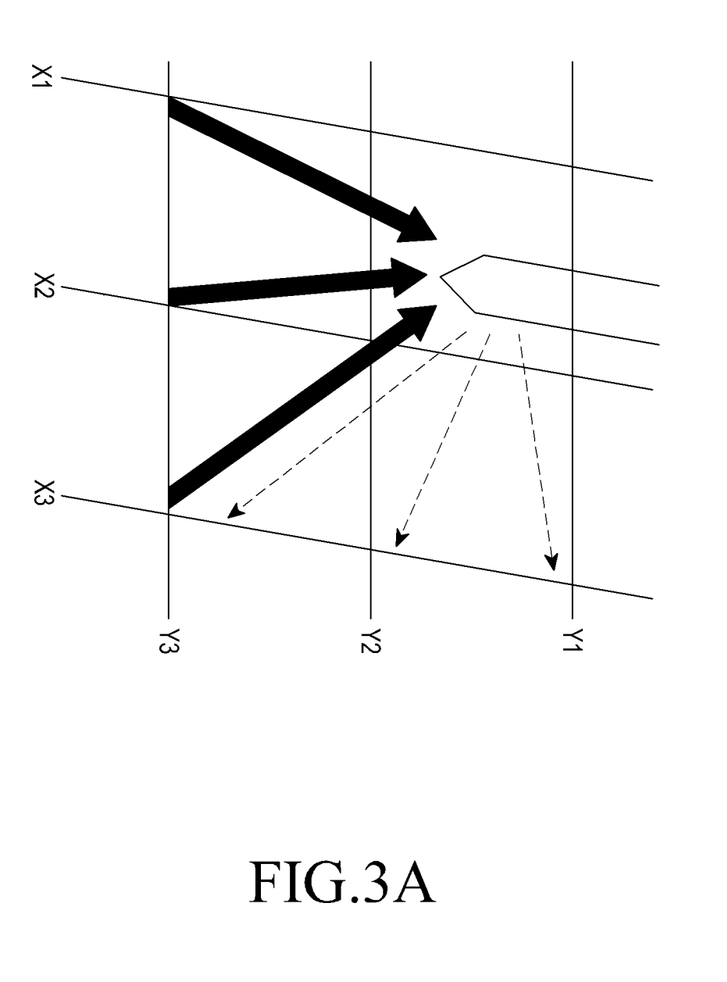
FIGS. 3A, 3B and 3C are conceptual diagrams illustrating a method for detecting the coordinates of an Electromagnetic Induction (EI) pen according to an embodiment of the present invention.
Figure 3B:
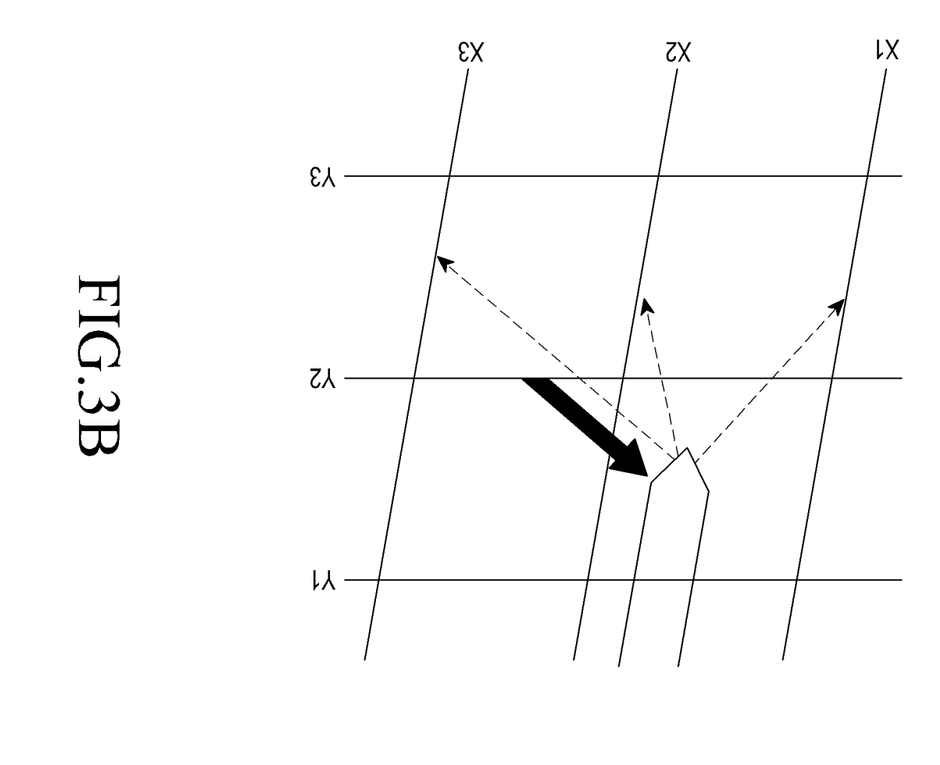
Figure 3C:
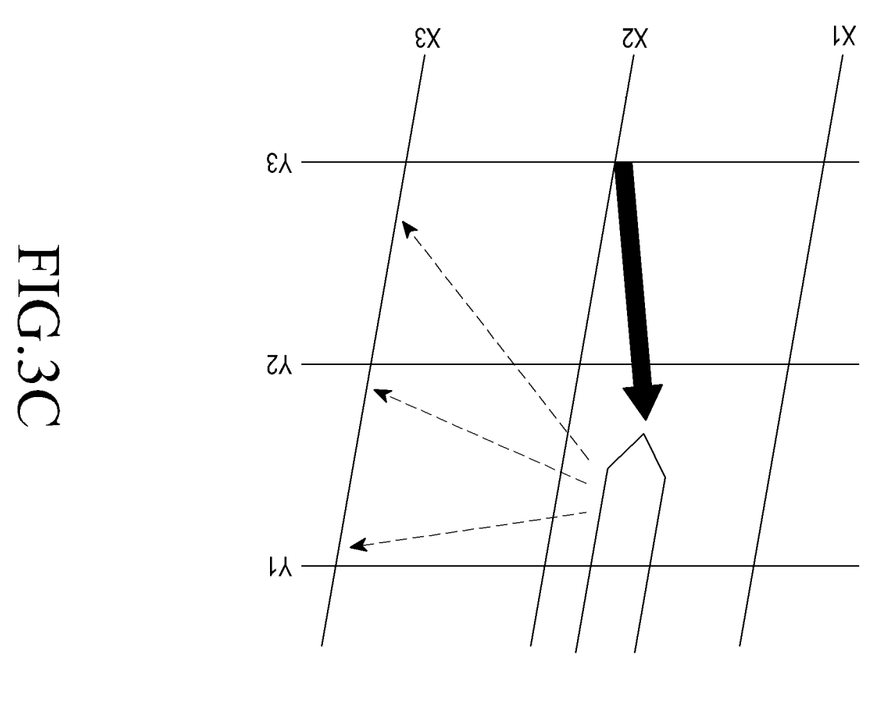

FIGS. 3A, 3B, and 3C are conceptual diagrams illustrating a method for detecting the coordinates of an EI pen according to an embodiment of the present invention.

In FIGS. 3A, 3B, and 3C, solid arrows denote electromagnetic fields emitted from loops and dotted lines denote changes in an electromagnetic field emitted from the EI pen.

Referring to FIG. 3A, when the EI pen approaches the loop unit, current flows through the first sub-loop unit to determine the X-axis coordinate of the EI pen. Meanwhile, the second sub-loop unit senses electromagnetic changes to determine the Y-axis coordinate of the EI pen. When the EI pen initially approaches, current flows through all loops X1, X2, and X3 of the first sub-loop unit, and then the EI pen receives an induced electromagnetic field from the first sub-loop unit and emits the received electromagnetic field. Each of loops Y1, Y2, and Y3 of the second sub-loop unit senses an electromagnetic change from the EI pen. The loops Y1, Y2, and Y3 of the second sub-loop unit sense electromagnetic changes in a predetermined order. As described herein above, the loops Y1, Y2, and Y3 of the second sub-loop unit may be grouped into a predetermined number of groups and sense electromagnetic changes on a group basis. The electromagnetic sensing apparatus determines a maximum signal loop Y2 with a sensing signal having a maximum magnitude from among the loops.

Referring to FIG. 3B, the first sub-loop unit senses electromagnetic changes while current flows through the second sub-loop unit. Meanwhile, the electromagnetic sensing apparatus may provide current only through the maximum signal loop Y2 among the loops of the second sub-loop unit.

The EI pen receives an electromagnetic field induced from the maximum signal loop Y2 and outputs the induced electromagnetic field. The loops X1, X2, and X3 of the first sub-loop unit sense electromagnetic changes from the EI pen and the electromagnetic sensing apparatus determines a maximum signal loop X2 from among the loops X1, X2, and X3 of the first sub-loop.

Referring to FIG. 3C, the second sub-loop unit senses electromagnetic changes while current flows through the first sub-loop unit. Meanwhile, the electromagnetic sensing apparatus provides current only through the maximum signal loop X2 of the first sub-loop unit. Subsequently, the electromagnetic sensing apparatus determines the time-series coordinates of the EI pen by providing current only through maximum signal loops If the location of the EI pen is changed, the electromagnetic sensing apparatus senses an electromagnetic change by changing a sensing group. For example, if the current maximum signal loop is Y2, the electromagnetic sensing apparatus compares a sensing signal from the loop Y1 with a sensing signal from the loop Y3. If the sensing signal from the loop Y1 is stronger than the sensing signal from the loop Y3, the electromagnetic sensing apparatus shifts the sensing group to the loop Y1. The same operation applies to determining a location with respect to the X axis, and these operations may be repeated until no electromagnetic change is detected from the EI pen.

Figure 4:
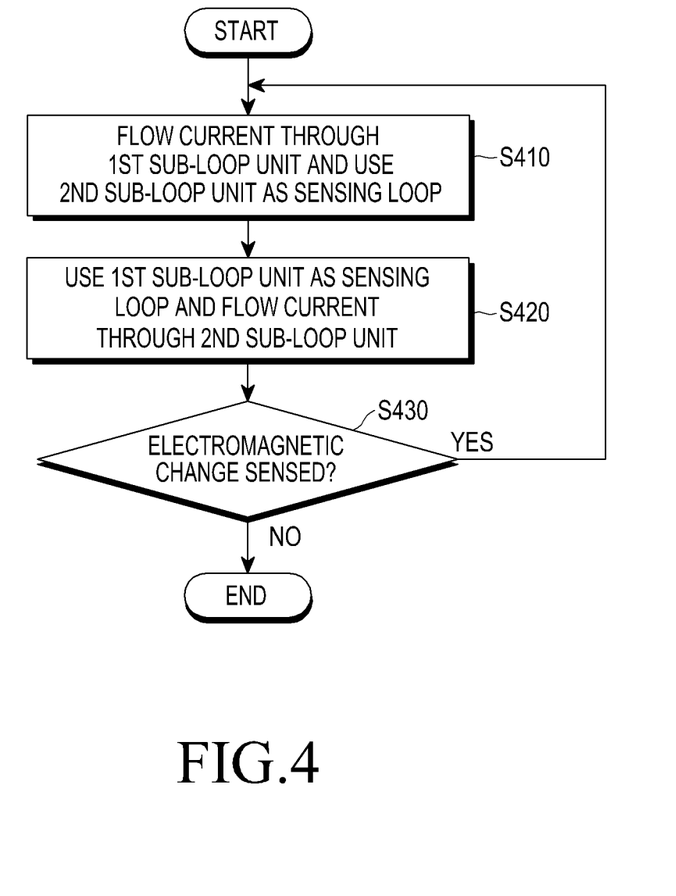
FIG. 4 is a flowchart illustrating a method for controlling an electromagnetic sensing apparatus according to an embodiment of the present invention.

FIG. 4 is a flowchart illustrating a method for controlling an electromagnetic sensing apparatus according to an embodiment of the present invention. In the present example, the electromagnetic sensing apparatus illustrated in FIG. 4 includes first and second sub-loop units that intersect perpendicularly with each other.

Referring to FIG. 4, the electromagnetic sensing apparatus provides current through the first sub-loop unit and controls the second sub-loop unit to sense electromagnetic changes, in step S410. After a predetermined time period, the electromagnetic sensing apparatus provides current through the second sub-loop unit and controls the first sub-loop unit to sense electromagnetic changes, in step S420. The above operations are repeated until no electromagnetic change is sensed from the EI pen, in step S430. In other words, the electromagnetic sensing apparatus controls the first sub-loop unit to alternate between current reception and electromagnetic change sensing. At the same time, the electromagnetic sensing apparatus controls the second sub-loop unit to alternate between current reception and electromagnetic change sensing, alternately with the first sub-loop unit at a predetermined time interval.

Each of the first and second sub-loop units includes a plurality of loops. At least two of the plurality of loops in each of the first and second sub-loop units, respectively, senses electromagnetic changes simultaneously. More specifically, the electromagnetic sensing apparatus group the loops of a sub-loop unit into a predetermined number of groups and controls the loops to sense electromagnetic changes on a group basis, rather than controlling the loops to individually sense electromagnetic changes.

Each of the first and second sub-loop units in the electromagnetic sensing apparatus includes a plurality of loops. Providing current through the second sub-loop unit, such as in step S420, may involve determining a first maximum signal loop having a maximum sensing signal in the second sub-loop unit that senses electromagnetic changes and flowing current only through the first maximum signal loop after a predetermined time period.

After providing current through the second sub-loop unit, such as in step S420, current flows through the first sub-loop unit again and the second sub-loop unit is controlled to sense electromagnetic changes. In this case, current may flow only through the first maximum signal loop during a predetermined time period and a second maximum sensing loop having a maximum sensing signal may be determined in the other sub-loop unit that does not include the first maximum signal loop in the step of flowing current through the first sub-loop unit again. In addition, while current is flowing only through the second maximum signal loop, sensing signals are measured only from a subset of the loops that include the first maximum signal loop in the sub-loop unit that senses electromagnetic changes, during a predetermined time period. A sensing point is determined using signals from the first and second maximum signal loops and their adjacent loops.

Figure 5:
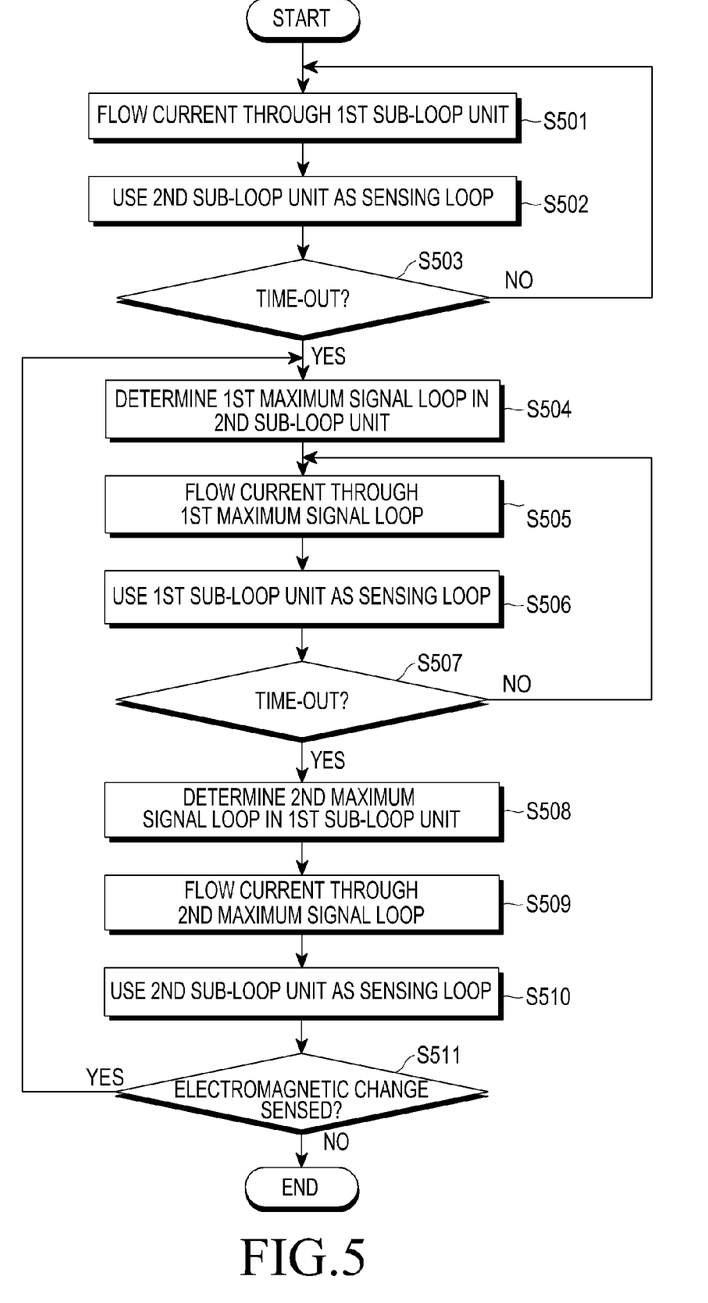
FIG. 5 is a flowchart illustrating a method for controlling an electromagnetic sensing apparatus according to another embodiment of the present invention.

FIG. 5 is a flowchart illustrating a method for controlling an electromagnetic sensing apparatus according to another embodiment of the present invention.

Referring to FIG. 5, the electromagnetic sensing apparatus provides current through the first sub-loop unit, in step S501. At the same time, the electromagnetic sensing apparatus uses the second sub-loop unit as a sensing loop, in step S502. The electromagnetic sensing apparatus determines whether a predetermined time period has elapsed, in step S503. Upon expiration of the predetermined time period, the electromagnetic sensing apparatus determines a first maximum signal loop having a maximum sensing signal from among the loops of the second sub-loop unit, in step S504. The electromagnetic sensing apparatus provides current only through the first maximum signal loop in step S505 and uses the first sub-loop unit as a sensing loop, in step S506. The electromagnetic sensing apparatus determines whether a predetermined time period has elapsed, in step S507. Upon expiration of the predetermined time period, the electromagnetic sensing apparatus determines a second maximum signal loop having a maximum sensing signal from among the loops of the first sub-loop unit, in step S508. The electromagnetic sensing apparatus provides current only through the second maximum signal loop, in step S509 and uses the second sub-loop unit as a sensing loop, in step S510. The above operations are repeated until no electromagnetic change is sensed from the EI pen, in step S511.

Figure 6:
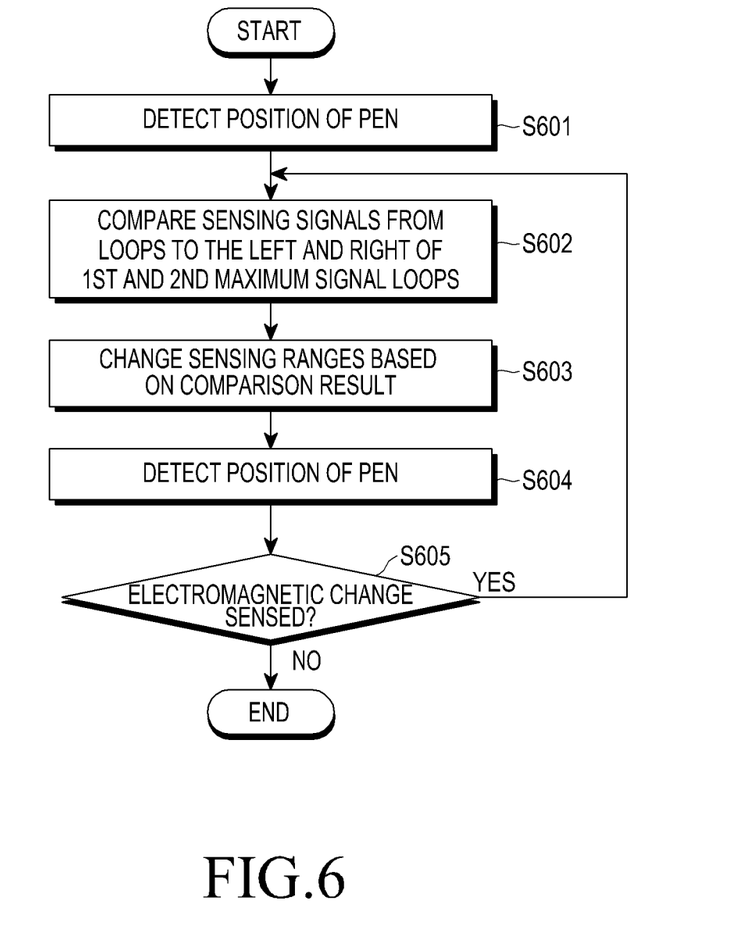
FIG. 6 is a flowchart illustrating a method for controlling an electromagnetic sensing apparatus according to further another embodiment of the present invention.

FIG. 6 is a flowchart illustrating a method for controlling an electromagnetic sensing apparatus according to further another embodiment of the present invention.

Referring to FIG. 6, the electromagnetic sensing apparatus detects the position of the EI pen, in step S601. Detection of an initial position of the EI pen is performed as described hereinabove in detail, and therefore, a further description of this process is omitted for conciseness.

The electromagnetic sensing apparatus receives sensing signals from loops corresponding to the position of the EI pen (i.e., from loops adjacent to the first and second maximum signal loops) and compares the received sensing signals, in step S602.

The electromagnetic sensing apparatus changes a sensing range based on the result of the comparison, in step S603. For example, if a sensing signal from a loop to the left of the maximum signal loop of the first sub-loop unit is stronger than a sensing signal from a loop to the right of the maximum signal loop of the first sub-loop unit, the electromagnetic sensing apparatus may shifts the entire sensing range to the left. The electromagnetic sensing apparatus subsequently repeats the same operations with respect to the second sub-loop unit. Thus, if a sensing signal from an adjacent loop is stronger than a sensing signal from the maximum signal loop of the second sub-loop unit, the electromagnetic sensing apparatus shifts the entire sensing range in a direction the loop having the stronger sensing signal is located.

The electromagnetic sensing apparatus may detects the position of the EI pen again based on the changed sensing range, in step S604 and repeats the above-described procedure until the electromagnetic change sensing ends, that is, no electromagnetic change is sensed from the EI pen, in step S605.

As is apparent from the above description of embodiments of the present invention, since current flows through only a subset of at least two loops from among a plurality of loops of a loop unit, power consumption is reduced and the size of an IC for a driver can also be decreased.

In addition, electromagnetic changes are sensed using sensing loops on a group basis rather than using loops individually. Consequently, a total sensing time can be reduced. The resulting increase in the number of sensing operations performed over a period of time increases an SNR.

When a sensing signal is degraded due to a high-resistance sensing loop, the sensing signal can be measured as many times as allowed by a decrease in sensing time achieved through simultaneous measurements, thereby maintaining SNR. If a predetermined number of sensing signals are measured at the same time, a driving voltage can be increased instead of increasing the number of measurements, thereby increasing SNR. In addition, circuitry can be simplified by implementing a transmitter in a voltage-driven fashion.

An EI pen according to embodiments of the present invention may include a condenser and a loop. As pressure applied to the tip of the EI pen changes capacity or inductance, the frequency of an electromagnetic field emitted from the EI pen changes. Therefore, a change in the pressure applied to the pen tip can be acquired based on the frequency change of a sensing signal. Meanwhile, the frequency change of a sensing signal may be detected as a phase change in a phase detector. The pressure of the pen tip can be calculated by monitoring the phase value of a sensing signal.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An electromagnetic sensing apparatus for measuring, using electromagnetic induction, a position of an object, the apparatus comprising:
   a loop unit including a first sub-loop unit and a second sub-loop unit; and
   a controller configured to control the first sub-loop unit to receive a current for generating an electromagnetic field transmitted to the object and the second sub-loop unit to sense an electromagnetic change generated based on the position of the object during a first time period and control the second sub-loop unit to receive a current for generating an electromagnetic field transmitted to the object and the first sub-loop unit to sense an electromagnetic change generated based on the position of the object during a second time period, wherein the second sub-loop unit includes a plurality of loops, and the controller is further configured to select a first maximum signal loop having a sensing signal, generated by the electromagnetic change, with a maximum magnitude among the plurality of the loops of the second sub-loop unit during the first time period and control to provide the current through the first maximum signal loop during the second time period.

2. The electromagnetic sensing apparatus of claim 1, wherein the first sub-loop unit includes a plurality of loops, and wherein the controller further configured to control at least two loops in each of the first sub-loop unit and the second sub-loop unit to sense an electromagnetic change.

3. The electromagnetic sensing apparatus of claim 1, further comprising:

a driver configured to apply a current to the loop unit; and a switch configured to alternately output the current received from the driver to the first sub-loop unit and the second sub-loop unit during the first time period and the second time period.

4. The electromagnetic sensing apparatus of claim 3, further comprising a signal processor configured to process the sensing signal induced by the electromagnetic change sensed by the loop unit, wherein the controller is further configured to control the switch to alternately connect the signal processor to the first sub-loop unit and the second sub-loop unit during the first time period and the second time period.

5. The electromagnetic sensing apparatus of claim 1, wherein the first sub-loop unit includes a plurality of loops, and the controller is further configured to provide current through the first maximum signal loop and selects a second maximum signal loop having a sensing signal, generated by the electromagnetic change, with a maximum magnitude among the plurality of loops of the first sub-loop unit during the second time period.

6. The electromagnetic sensing apparatus of claim 5, wherein while providing the current through the second maximum signal loop during a third time period, the controller is further configured to measure sensing signals from at least two loops including the first maximum signal loop of the second sub-loop unit to sense an electromagnetic change.

7. The electromagnetic sensing apparatus of claim 5, wherein the controller is further configured to determine the sensing point corresponding to the position of the object based on sensing signals from the first maximum signal loop and the second maximum signal loop and loops adjacent to the first and second maximum signal loops.

8. A method for controlling an electromagnetic sensing apparatus for measuring, by electromagnetic induction, a position of an object, comprising:

receiving, by a first sub-loop unit, a current for generating an electromagnetic field transmitted to the object and sensing, by a second sub-loop unit, an electromagnetic change generated based on the position of the object during a first time period; and receiving, by the second sub-loop unit, a current for generating an electromagnetic field transmitted to the object and sensing, by the first sub-loop unit, an electromagnetic change generated based on the position of the object during a second time period, wherein sensing the electromagnetic change by a second sub-loop unit comprises selecting a first maximum signal loop having a sensing signal, generated by the electromagnetic change, with a maximum magnitude in the second sub-loop unit, and wherein receiving the current by the second sub-loop unit comprises providing the current through the first maximum signal loop.

9. The method of claim 8, wherein each of the first and second sub-loop units includes a plurality of loops and sensing the electromagnetic change includes simultaneously sensing the electromagnetic change simultaneously by at least two of the plurality of loops in one of the first and second sub-loop units set to sense an electromagnetic change.

10. The method of claim 8, further comprising:

processing the sensing signal induced by the electromagnetic change.

11. The method of claim 8, wherein sensing the electromagnetic change by the first sub-loop unit comprises selecting a second maximum signal loop having a sensing signal, generated by the electromagnetic change, with a maximum magnitude in the first sub-loop unit.

12. The method of claim 11, further comprising determining a sensing point corresponding to the position of the object based on sensing signals from the first maximum signal loop and the second maximum signal loops and loops adjacent to the first and second maximum signal loops.

* * * * *